(12) United States Patent
Thrimawithana

(10) Patent No.: US 11,836,218 B2
(45) Date of Patent: Dec. 5, 2023

(54) SYSTEM AND METHOD FOR OBJECT DETECTION AND DIMENSIONING

(71) Applicant: ZEBRA TECHNOLOGIES CORPORATION, Lincolnshire, IL (US)

(72) Inventor: Raveen T. Thrimawithana, Pannipitiya (LK)

(73) Assignee: Zebra Technologies Corporation, Lincolnshire, IL (US)

( * ) Notice: Subject to any disclaimer, the term of this patent is extended or adjusted under 35 U.S.C. 154(b) by 19 days.

(21) Appl. No.: 17/405,919

(22) Filed: Aug. 18, 2021

(65) Prior Publication Data

US 2023/0056676 A1     Feb. 23, 2023

(51) Int. Cl.
*G06T 7/50*        (2017.01)
*G06F 18/2137*     (2023.01)
*G06V 10/75*       (2022.01)
*G06F 18/23*       (2023.01)

(52) U.S. Cl.
CPC .......... *G06F 18/2137* (2023.01); *G06F 18/23* (2023.01); *G06T 7/50* (2017.01); *G06V 10/757* (2022.01)

(58) Field of Classification Search
CPC ....... G06F 18/2137; G06F 18/23; G06T 7/50; G06V 10/757
See application file for complete search history.

(56) References Cited

U.S. PATENT DOCUMENTS

| | | | | |
|---|---|---|---|---|
| 10,956,726 B1* | 3/2021 | Quark | ..................... | G06T 19/20 |
| 2014/0063018 A1 | 3/2014 | Takeshita | | |
| 2017/0023780 A1* | 1/2017 | Braker | .................. | G03B 37/06 |
| 2017/0124717 A1* | 5/2017 | Baruch | ..................... | G06T 7/50 |
| 2020/0019778 A1 | 1/2020 | Frei et al. | | |
| 2021/0124943 A1 | 4/2021 | Datar et al. | | |
| 2021/0133928 A1 | 5/2021 | Ding et al. | | |
| 2021/0150227 A1* | 5/2021 | Hu | ......................... | G06V 10/25 |
| 2022/0026920 A1 | 1/2022 | Ebrahimi Afrouzi et al. | | |

FOREIGN PATENT DOCUMENTS

CN         112200874 A  *  1/2021  ............... G06T 7/10

OTHER PUBLICATIONS

Fathi et al, Semantic Instance Segmentation via Deep Metric Learning, 2017, arXiv: 1703.10277v1, p. 1-9. (Year: 2017).*
De Brabandere et al, Semantic Instance Segmentation with a Discriminative Loss Function, 2017, arXiv: 1708.02551v1, p. 1-10. ( Year: 2017).*
Wang et al, CenterMask: single shot instance segmentation with point representation, 2020, arXiv:2004.04446v2, p. 1-9. (Year: 2020).*
International Search Report and Written Opinion for International Application No. PCT/US2022/40533 dated Dec. 19, 2022.

* cited by examiner

*Primary Examiner* — John Villecco
*Assistant Examiner* — Kathleen M Broughton

(57) ABSTRACT

A method for detecting and dimensioning a target object includes: obtaining depth data representing a target object; defining a mask having a structure which decreases in density away from a central point of the mask; overlaying the mask on the depth data and selecting a subset of the depth data comprising data points which contact the mask; detecting a cluster of data points from the subset; detecting, based on the cluster, the target object; and outputting a representation of the target object.

22 Claims, 6 Drawing Sheets

SYSTEM AND METHOD FOR OBJECT DETECTION AND DIMENSIONING

BACKGROUND

Object detection and dimensioning may be necessary in a wide variety of applications. For example, it may be desirable to determine the dimensions of packages in a warehouse prior to shipping. In order to determine the dimensions of an object, the object may first need to be segmented from a point cloud including extraneous data representing the surrounding environment of the object. The segmentation process may slow down the dimensioning process causing it to be slower and error-prone.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
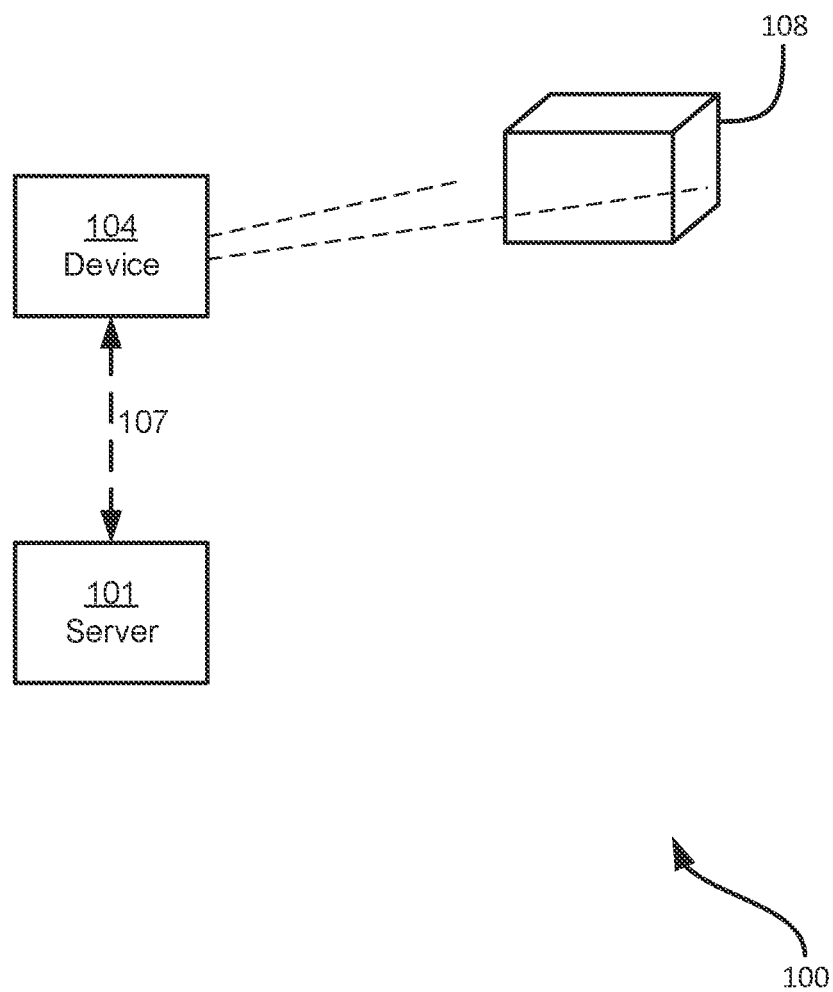
FIG. 1 is a schematic diagram of a system for detecting and dimensioning a target object.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method comprising: obtaining depth data representing a target object; defining a mask having a structure which decreases in density away from a central point of the mask; overlaying the mask on the depth data and selecting a subset of the depth data comprising data points having coordinates which match coordinates of a point of the mask; detecting a cluster of data points from the subset; detecting, based on the cluster, the target object; and determining an object dimension of the target object based on the cluster.

Additional examples disclosed herein are directed to a device comprising: a depth sensor configured to obtain depth data representing a target object; a memory; a processor interconnected with the depth sensor and the memory, the processor configured to: obtain, from the depth sensor, depth data representing the target object; define a mask having a structure which decreases in density away from a central point of the mask; overlay the mask on the depth data and select a subset of the depth data comprising data points having coordinates which match coordinates of a point of the mask; detect a cluster of data points from the subset; detect, based on the cluster, the target object; and determine an object dimension of the target object based on the cluster.

Additional examples disclosed herein are directed to a non-transitory computer-readable medium storing a plurality of computer-readable instructions executable by a processor, wherein execution of the instructions configures the processor to: obtain, from a depth sensor, depth data representing a target object; define a mask having a structure which decreases in density away from a central point of the mask; overlay the mask on the depth data and select a subset of the depth data comprising data points having coordinates which match coordinates of a point of the mask; detect a cluster of data points from the subset; detect, based on the cluster, the target object; and determine an object dimension of the target object based on the cluster.

FIG. 1 depicts a system 100 for object detection in accordance with the teachings of this disclosure. The system 100 includes a server 101 in communication with a computing device 104 (also referred to herein as the dimensioning device 104 or simply the device 104) via a communication link 107, illustrated in the present example as including wireless links. For example, the link 107 may be provided by a wireless local area network (WLAN) deployed by one or more access points (not shown). In other examples, the server 101 is located remotely from the device 104 and the link 107 may therefore include one or more wide-area networks such as the Internet, mobile networks, and the like.

The system 100, and more particularly, the device 104, is deployed to detect objects, such as a box 108, for example to dimension the box 108. In order to dimension the box 108, the device 104 first obtains depth data representing the box 108 and its surrounding environment and then identify the data points representing the box 108. In order to filter the data points to obtain the data points representing the box 108, traditionally, computing devices may apply preprocessing algorithms, to remove data points representing the background or surrounding environment. For example, computing devices may apply plane detection, segmentation of the depth data into multiple objects, identification or recognition processes to deduce the target object from the surrounding environment, and the like. Accordingly, segmentation of the data points representing the box 108 may be time-consuming, resulting in a dimensioning operation which is also time-consuming and error prone.

Accordingly, to segment the target object from the depth data, the device 104 is configured to define a mask having a structure which decreases in density away from a central point of the mask. This mask is then overlaid on the depth data and used to select a subset of the depth data. Since the mask decreases in density away from the central point of the mask, the subset of data points favors selection of points close to the central point of the mask. The target object is likely to be generally centered in the frame of depth data, hence, if the mask is overlaid on the depth data such that the central point is centered on the frame of depth data, the central point is likely to be overlaid on the target object. Accordingly, the subset of data points is likely to favor data points on the target object. The subset can then be used to generate a cluster of data points about a starting point which is close to the central point of the mask. The cluster is therefore likely to represent the target object and can be used to detect the target object, either directly, or by using a bounding region of the cluster to retrieve a denser subset of the originally captured depth data. The device can therefore detect the target object more quickly and with greater accuracy. The device then use the detected target object to dimension the target object and output dimensions of the target object with greater speed and accuracy.

Figure 2:
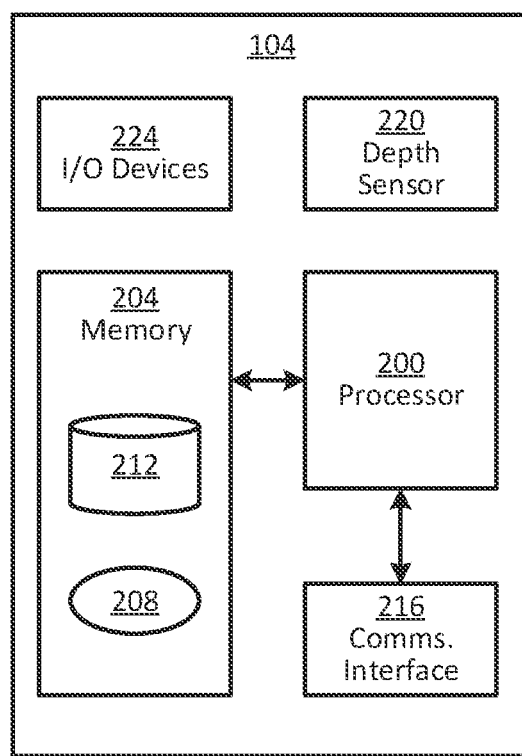
FIG. 2 is a block diagram of certain internal hardware components of the detection device of FIG. 1.

Turning now to FIG. 2, certain internal components of the computing device 104 are illustrated. The device 104 includes a processor 200 interconnected with a non-transitory computer-readable storage medium, such as a memory 204. The memory 204 includes a combination of volatile memory (e.g. Random Access Memory or RAM) and non-volatile memory (e.g. read only memory or ROM, Electrically Erasable Programmable Read Only Memory or EEPROM, flash memory). The processor 200 and the memory 204 may each comprise one or more integrated circuits.

The memory 204 stores computer-readable instructions for execution by the processor 200. In particular, the memory 204 stores an application 208 which, when executed by the processor, configures the processor 200 to perform various functions discussed below in greater detail and related to the target detection and modelling operation of the device 104. The application 208 may also be implemented as a suite of distinct applications.

Those skilled in the art will appreciate that the functionality implemented by the processor 200 may also be implemented by one or more specially designed hardware and firmware components, such as a field-programmable gate array (FPGAs), application-specific integrated circuits (ASICs) and the like in other embodiments. In an embodiment, the processor 200 may be, respectively, a special purpose processor which may be implemented via dedicated logic circuitry of an ASIC, an FPGA, or the like in order to enhance the processing speed of the operations discussed herein. The memory 204 also stores a repository 212 storing rules and data for the target detection and dimensioning operation. For example, the repository 212 may store predefined masks, rules for generating masks, captured depth data and determined dimensions, and the like.

The device 104 also includes a communications interface 216 enabling the device 104 to exchange data with other computing devices such as the server 101. The communications interface 216 is interconnected with the processor 200 and includes suitable hardware (e.g. transmitters, receivers, network interface controllers and the like) allowing the device 104 to communicate with other computing devices—such as the server 101—via the link 107. The specific components of the communications interface 216 are selected based on the type of network or other links that the device 104 is to communicate over. The device 104 can be configured, for example, to communicate with the server 101 via the link 107 using the communications interface to send data to the server 101.

The device 104 further includes a depth sensor 220 interconnected with the processor 200. The processor 200 is enabled to control the depth sensor 220 to capture data representing a target object, such as the box 108. For example, the depth sensor 220 may be a 3D digital camera capable of capturing depth data, one or more LIDAR sensors, a stereoscopic imaging system, or the like. In some examples, more than one depth sensor 220 may be included in the device 104. Additionally, the device 104 may also include other sensors, such as image sensors (not shown), to capture data for the target detection and dimensioning operation.

The device 104 may further include one or more input and/or output devices 224. The input devices 224 may include one or more buttons, keypads, touch-sensitive display screens or the like for receiving input from an operator. The output devices 224 may further include one or more display screens, sound generators, vibrators, or the like for providing output or feedback to an operator.

Figure 3:
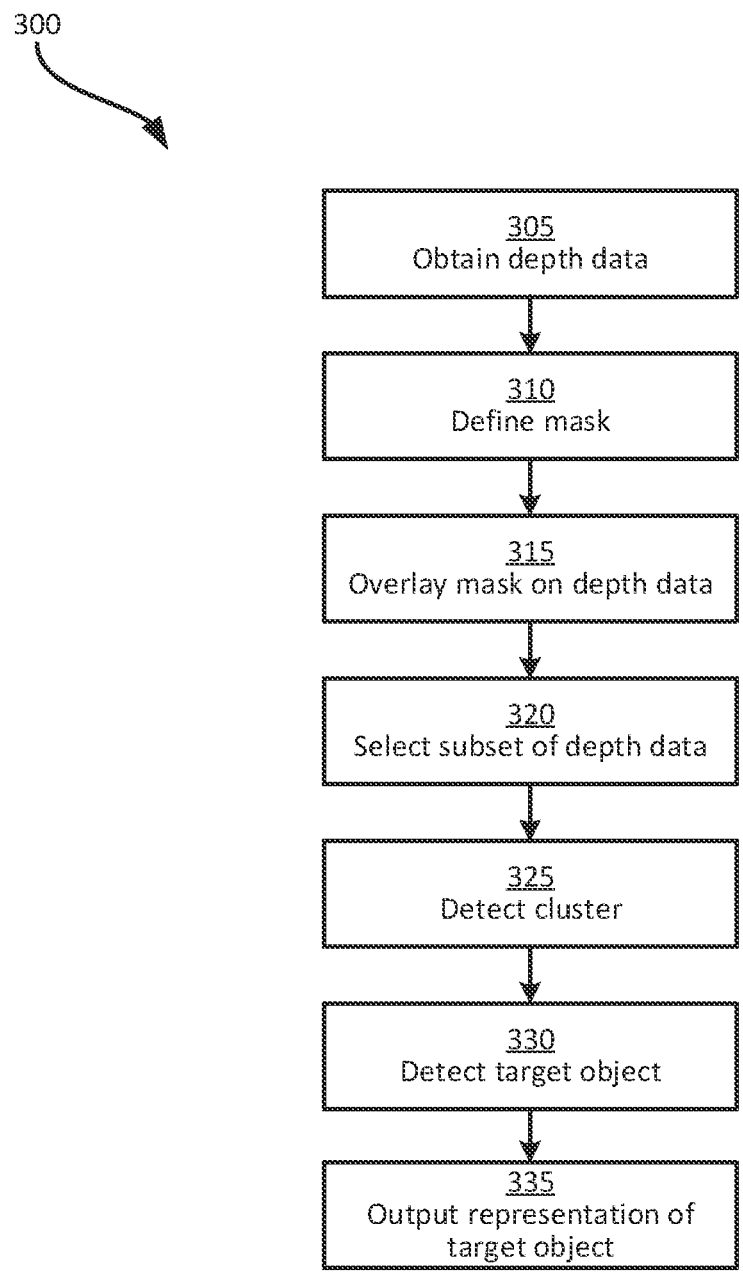
FIG. 3 is a flowchart of a method of detecting a target object.

Turning now to FIG. 3, the functionality implemented by the device 104 will be discussed in greater detail. FIG. 3 illustrates a method 300 of detecting and dimensioning a target object. The method 300 will be discussed in conjunction with its performance in the system 100, and particularly by the device 104, via execution of the application 208. In particular, the method 300 will be described with reference to the components of FIGS. 1 and 2. In other examples, the method 300 may be performed by other suitable devices or systems, such as the server 101.

The method 300 is initiated at block 305, where the device 104 obtains depth data representing the target object, such as the box 108. The depth data may be a point cloud—i.e., a collection of data points each representing a distance or depth of the nearest surface from the sensor. The depth data may include relevant data points representing the target object, as well as additional data points representing the surrounding environment of the target object.

At block 310, the device 104 defines a two-dimensional mask to overlay on the depth data. In particular, the mask has a central point and a structure which decreases in density away from the central point of the mask. In other words, the mask structure has a higher density close to the central point, and a lower density, or more negative space away from the central point, near the edges of the mask.

The mask may have a structure including an arrangement of lines arranged around the central point. In particular, the arrangement of lines of the mask may have a greater density closer to the central point, and a lower density near the edges of the mask.

For example, the lines may extend radially from the central point of the mask. In such examples, the lines may generally be evenly distributed about the central point to approximately evenly. The number of radial lines in the mask may be selected based on properties of the depth data, such as the resolution of the depth data and the minimum depth of the depth data, to improve selection of the data points, as described in further detail below. For example, the number of lines selected for the mask may increase with the resolution of the depth data. Additionally, the number of lines selected for the mask may increase with the minimum depth of the depth data.

In other examples, the lines may be arranged in a spiral or another suitable arrangement in which the density of the lines decreases away from the mask center point. In still further examples, the mask structure need not be an arrangement of lines and may be an arrangement of dots or other two-dimensional shapes which have decreasing density away from the mask center point. The structure of the mask (e.g., number of dots or shapes, or the arrangement of the spiral) may similarly be selected based on the properties of the depth data to improve the selection of data points.

At block 315, after generating the mask, the device 104 overlays the mask on the depth data. Generally, it may be assumed that a user operating the device 104 may approximately center the target object in the frame of view when capturing the frame of depth data. Accordingly, the device 104 may align the central point with a center of the frame of depth data. The central point may thus generally be assumed to be overlaid on a part the target object. In other examples, the device 104 may select a different alignment for the mask. For example, if a user of the device 104 selects a focus point during the data capture operation, the device 104 may align the central point of the mask with the selected focus point.

The mask may generally be defined to have the same shape and size as the frame of depth data. For example, when defining a mask with radially extending lines, the radial lines may be defined to extend from the central point of the mask to the edge of the frame of depth data, based on the position of the central point on the frame of data.

At block 320, the device 104 selects a subset of the depth data. Specifically, the device 104 selects data points which contact the mask for inclusion in the subset. A data point may be said to contact the mask when the data point has coordinates which match coordinates of a point of the mask. For example, the data points of the depth data may be defined by X-, Y-, and Z-coordinates, while the mask is two-dimensional, for example in the XY plane. Accordingly, the device 104 may select the X- and Y-coordinates of the data point (i.e., the coordinates corresponding to the plane of the mask) and compare them to the mask; if the XY-coordinates of the data point match the XY-coordinates of a point on the mask, the data point may be said to contact the mask. In other examples, the points of the mask may be treated as lines having infinite depth (i.e., extending along the Z-axis), and hence the device 104 may compare the data point to the mask, including the lines having infinite depth. In some examples, a data points may be defined to have coordinates which match the coordinates of a point of the mask if the coordinates are within a threshold distance of the point of the mask.

Figure 4:
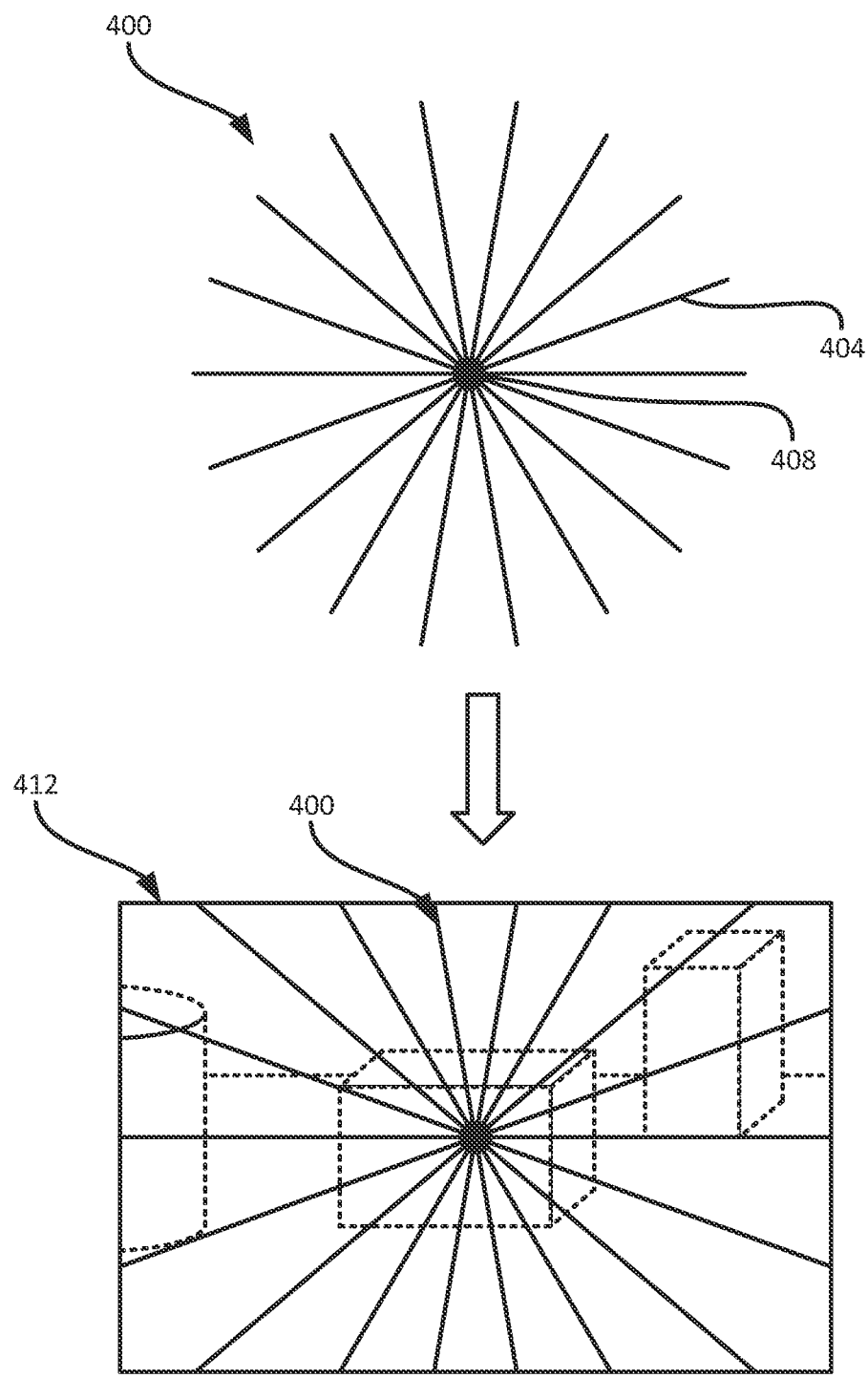
FIG. 4 is a schematic diagram of an example performance of blocks 310 and 315 of the method of FIG. 3.

For example, FIG. 4 depicts a mask 400 including a plurality of radial lines 404 extending from a central point 408. As can be seen, the radial lines 404 are spaced approximately evenly about the central point 408. The mask 400 may then be overlaid on a frame 412 of depth data. A subset of the depth data, in particular, the data points which lie along the radial lines 404, is then selected for further processing. The remaining data points of the depth data are disregarded.

The structure of the mask therefore influences the data points and the number of data points selected to be in the subset. In particular, since the central point of the mask is overlaid on the center of the frame of data, data points from the depth data which are close to the central point are likely to represent the target object. Data points which are further from the central point, closer to the edges of the frame of the depth data are similarly more likely to represent the surrounding environment of the target object. Thus, since the mask has a higher density closer to the central point, the data points which are likely to represent the target object are selected in higher proportions as part of the subset, while the data points which are closer to the edges of the frame of the depth data and are likely to represent the surrounding environment are selected in lower proportions based on the decreasing density of the structure of the mask.

Additionally, as described above, the number of radial lines in the mask may be selected based on properties of the depth data, such as the point cloud resolution and the minimum depth in the point cloud. For example, when the resolution of the depth data is higher, the number of lines defined in the mask may increase in order to select more of the data points of the depth data. Similarly, when objects detected by the sensor which obtained the depth data are further from the sensor, they are likely to occupy relatively less space in the frame than if the objects were closer, and hence the mask may include more lines to capture a higher proportion of the data points of the target object.

Returning to FIG. 3, at block 325, the device 104 detects a cluster of data points from the subset selected at block 320. For example, the device 104 may select a starting point from the subset. In particular, the starting point may be selected to be near a center of the frame of depth data or near the central point of the mask. For example, the starting point may be the closest data point of the subset to the central point of the mask. The device 104 may then select the cluster of data points about the selected starting point. In particular, the device 104 may employ Euclidian clustering to detect the cluster from the subset. That is, the device 104 may select a closest point to the current point, and determine whether the point is within a threshold distance of the current point. If the point is within the threshold distance, it is added to the cluster.

Thus, by starting the cluster at a starting point near the central point of the mask, the starting point is likely to lie on the target object. The detected cluster is therefore likely to represent the target object. Objects which are part of the surrounding environment are less likely to be included in the cluster. First, points representing the background are likely to be above the threshold distance from the current point of the cluster due to their distance from the target object. Additionally, as the points get closer to the edge of the frame of view of the depth data, the points are selected to be part of the subset in decreasing proportions due to the mask structure density decreasing away from the central point. The decreasing density of the mask structure therefore accentuates the likelihood of the points of the surrounding environment being above the threshold distance from the current point of the cluster, particularly for points further away from the center of the frame of the depth data.

Figure 5:
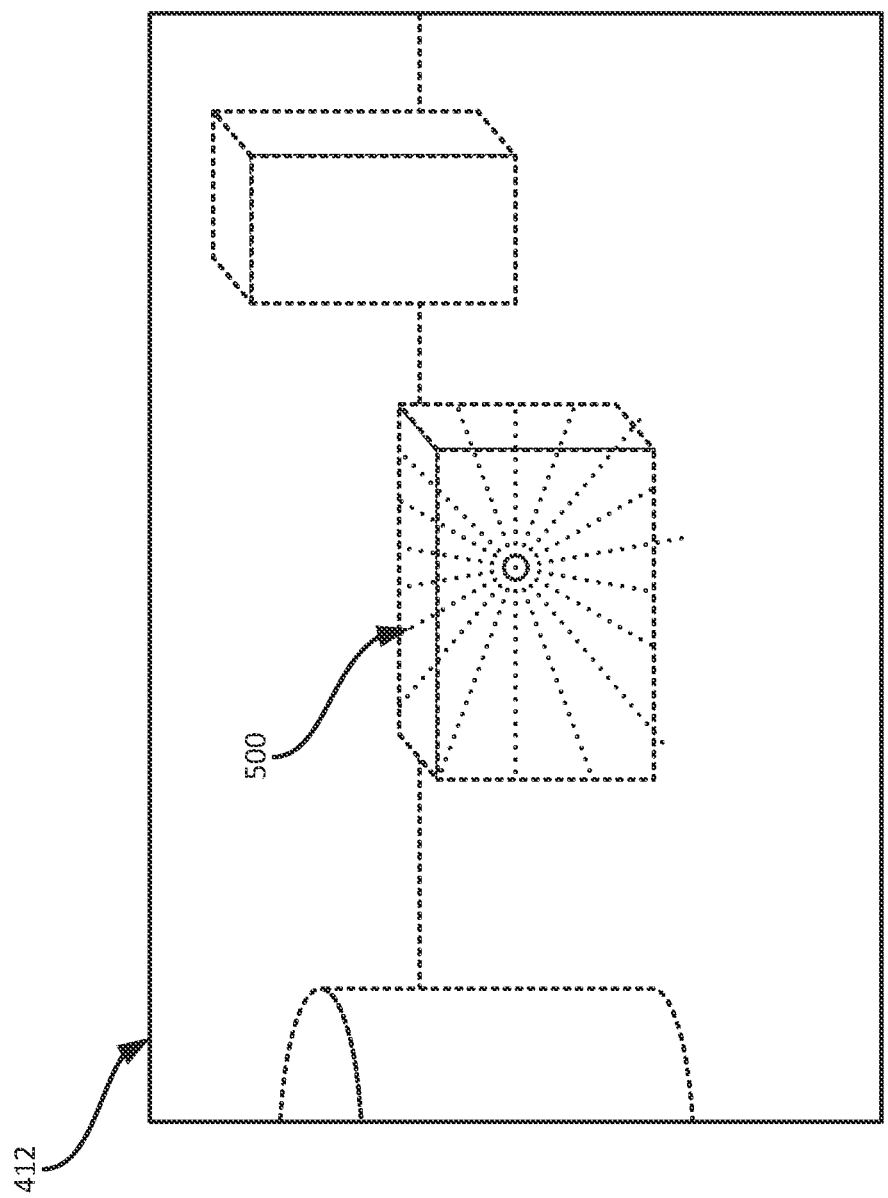
FIG. 5 is a schematic diagram of an example performance of block 325 of the method of FIG. 3.

For example, referring to FIG. 5, the frame of depth data 412 is depicted. A cluster 500 is detected from the frame of depth data 412 using the mask 400. In particular, the cluster 500 includes data points from the frame 412 along the mask 400. The cluster 500 is generated about the central point 408, and since the central point 408 of the mask 400 is located on the target object, such as the box 108, the cluster 500 includes data points which are primarily located on the box 108 and the surrounding surface supporting the box 108.

Returning again to FIG. 3, at block 330, the device 104 detects the target object based on the cluster detected at block 325. The device 104 may use the data points of the detected cluster to detect the target object directly, or the device 104 may use the detected cluster to select another subset of the originally captured depth data, and use this second subset to detect the target object. The manner of detecting the target object may depend, for example, on the number of points in the cluster.

Figure 6:
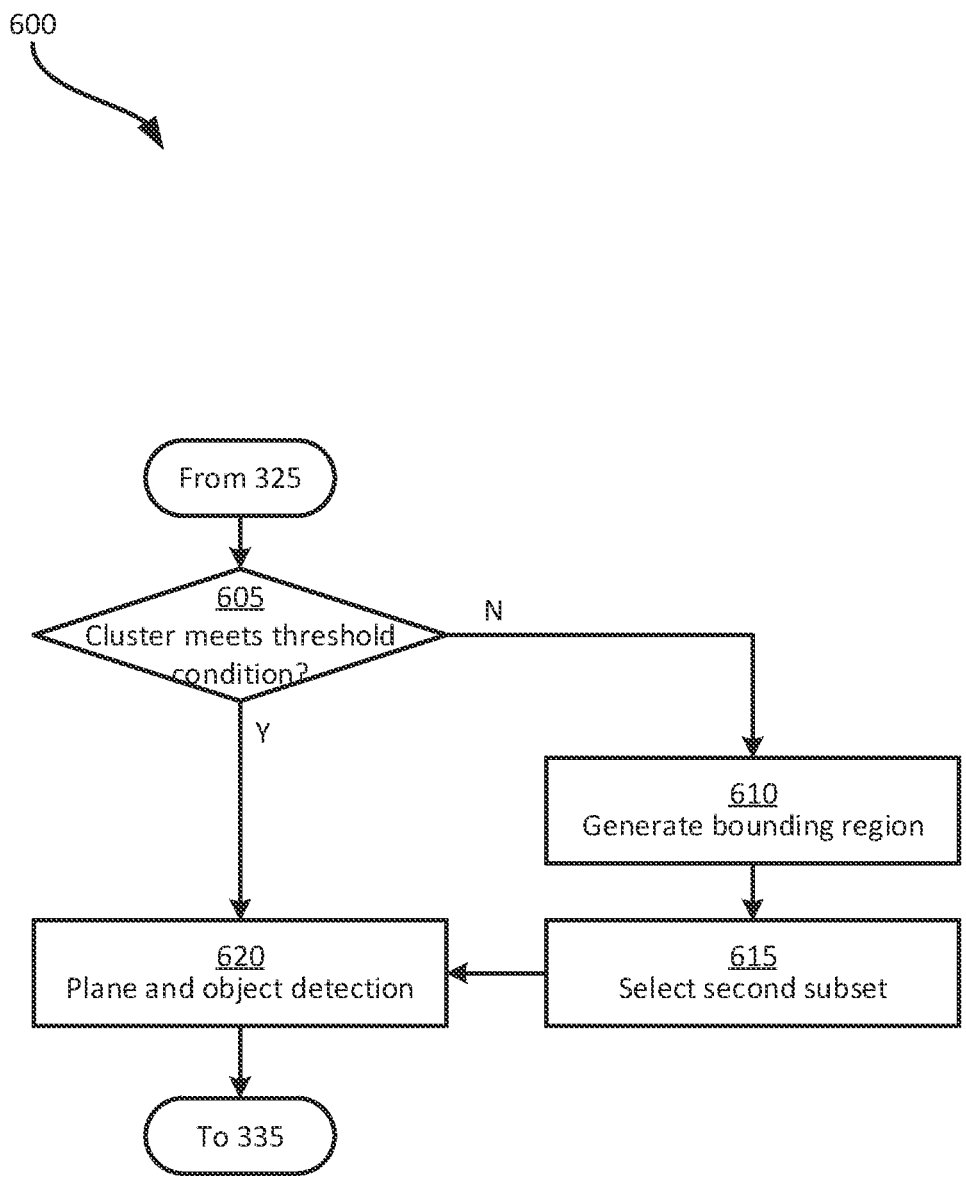
FIG. 6 is a flowchart of an example method of detecting the target object at block 330 of the method of FIG. 3.

For example, referring to FIG. 6, an example method 600 of detecting the target object is depicted.

At block 605, the device 104 determines whether the cluster detected at block 325 meets a threshold condition, such as including at least a threshold number of data points. The threshold number of data points may be predefined and stored in the repository 212. In other examples, rather than comparing to a threshold number of data points, the cluster may be compared to other threshold conditions, such as a threshold density, or the like. More generally, the threshold condition allows the device 104 to predict whether the cluster contains sufficient data to allow the device 104 to detect the target object from the cluster directly.

If the determination at block 605 is affirmative, that is that the cluster contains sufficient data to allow the device 104 to detect the target object from the cluster directly, the device 104 proceeds directly to block 620.

If the determination at block 605 is negative, that is that the cluster does not contain sufficient data to allow the device 104 to detect the target object from the cluster directly, then the device 104 proceeds to block 610. At block 610, the device 104 generates a bounding region for the cluster. That is, the bounding region may be a box (i.e., a rectangle), another regular shape, or any suitable closed figure which contains the points of the cluster.

At block 615, the device 104 applies the bounding region to the originally captured depth data and selects a second subset from the depth data. That is, the device 104 may overlay the bounding region on the depth data and select, as the second subset, the data points which are contained within the bounding region. Notably, the second subset is generally denser and includes more data points than the cluster, since it is selected from the originally captured depth data, and does not disregard data points which do not contact or lie on the mask.

At block 620, the device 104 performs plane and object detection to identify the object from the cluster or the second subset of data, as applicable. The device 104 may use known plane or object detection algorithms. In particular, since the cluster or second subset of data contains data points corresponding primarily to the target object, the target object is identified by the plane and object detection algorithms with greater accuracy.

Returning to FIG. 3, at block 335, the device 104 outputs a representation of target object. For example, the device 104 may display a representation of the box 108 at a display of the device 104. In some examples, the device 104 may use the object detected at block 330 to dimension the target object. Since the target object is identified with greater accuracy, the dimensioning of the target object may also have a correspondingly increased accuracy. Accordingly, the representation of the target object output at block 335 may include the dimensions of the target object.

As described above, the device 104 is able to reduce the computational complexity and increase the speed of the device 104 in dimensioning the target object. In particular, the mask is easily generated and based on its structure with a decreasing density away from the central point of the mask, allows for selection of a higher proportion of data points close to the center of frame of depth data. A higher proportion of the selected data points are therefore likely to represent the target object. Additionally, by applying clustering to the selected data points, data points representing the background or environment of the target object are less likely to be captured in the cluster, and the cluster is more likely to be an accurate representation of the target object. The mask application and clustering therefore allow the device 104 to quickly segment the depth data to identify the target object without requiring time-consuming and error-prone pre-processing algorithms. The device 104 can therefore quickly and accurately use the cluster to determine the dimensions of the target object.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method comprising:
   obtaining, from a depth sensor, depth data representing a target object;
   defining a mask having a structure which decreases in density away from a central point of the mask;
   overlaying the mask on the depth data and selecting a subset of the depth data comprising data points having coordinates which match coordinates of a point of the mask;
   detecting a cluster of data points from the subset;
   detecting, based on the cluster, the target object; and
   determining an object dimension of the target object based on the cluster.

2. The method of claim 1, wherein the mask comprises an arrangement of lines which decrease in density away from the central point.

3. The method of claim 2, wherein the lines extend radially from the central point of the mask.

4. The method of claim 1, wherein overlaying the mask on the depth data comprises aligning the central point with a center of a frame of the depth data.

5. The method of claim 1, wherein detecting the cluster of data points from the subset comprises:
   selecting a starting point from the subset of the depth data, the starting point comprising a closest data point of the subset to the central point of the mask; and
   selecting the cluster of data points about the starting point.

6. The method of claim 1, wherein detecting the target object comprises applying plane and object detection to the detected cluster of data points.

7. The method of claim 1, wherein detecting the target object comprises:
   generating a bounding region for the cluster of data points;
   selecting a second subset of the depth data comprising data points contained in the bounding region; and
   applying plane and object detection to the second subset of depth data to identify the target object.

8. A device comprising:
   a depth sensor configured to obtain depth data representing a target object;
   a memory;
   a processor interconnected with the depth sensor and the memory, the processor configured to:
   obtain, from the depth sensor, depth data representing the target object;
   define a mask having a structure which decreases in density away from a central point of the mask;
   overlay the mask on the depth data and select a subset of the depth data comprising data points having coordinates which match coordinates of a point of the mask;
   detect a cluster of data points from the subset;
   detect, based on the cluster, the target object; and
   determine an object dimension of the target object based on the cluster.

9. The device of claim 8, wherein the mask comprises an arrangement of lines which decrease in density away from the central point.

10. The device of claim 9, wherein the lines extend radially from the central point of the mask.

11. The device of claim 8, wherein, to overlay the mask on the depth data, the processor is configured to align the central point of the mask with a center of a frame of the depth data.

12. The device of claim 8, wherein, to detect the cluster of data points from the subset, processor is configured to:
   select a starting point from the subset of the depth data, the starting point comprising a closest data point of the subset to the central point of the mask; and
   select the cluster of data points about the starting point.

13. The device of claim 8, wherein to detect the target object, the processor is configured to: apply plane and object detection to the detected cluster of data points.

14. The device of claim 8, wherein to detect the target object, the processor is configured to:
   generate a bounding region for the cluster of data points;
   select a second subset of the depth data comprising data points contained in the bounding region; and
   apply plane and object detection to the second subset of depth data to identify the target object.

15. A non-transitory computer-readable medium storing a plurality of computer-readable instructions executable by a processor, wherein execution of the instructions configures the processor to:
   obtain, from a depth sensor, depth data representing a target object;
   define a mask having a structure which decreases in density away from a central point of the mask;
   overlay the mask on the depth data and select a subset of the depth data comprising data points having coordinates which match coordinates of a point of the mask;
   detect a cluster of data points from the subset;
   detect, based on the cluster, the target object; and
   determine an object dimension of the target object based on the cluster.

16. The non-transitory computer-readable medium of claim 15, wherein the mask comprises an arrangement of lines which decrease in density away from the central point.

17. The non-transitory computer-readable medium of claim 16, wherein the lines extend radially from the central point of the mask.

18. The non-transitory computer-readable medium of claim 15, wherein, to overlay the mask on the depth data, the instructions configure the processor to: align the central point of the mask with a center of a frame of the depth data.

19. The non-transitory computer-readable medium of claim 15, wherein, to detect the cluster of data points from the subset, instructions configure the processor to:
   select a starting point from the subset of the depth data, the starting point comprising a closest data point of the subset to the central point of the mask; and
   select the cluster of data points about the starting point.

20. The non-transitory computer-readable medium of claim 15, wherein to detect the target object, the instructions configure the processor to: apply plane and object detection to the detected cluster of data points.

21. The non-transitory computer-readable medium of claim 15, wherein to detect the target object, the instructions configure the processor to:
generate a bounding region for the cluster of data points;
select a second subset of the depth data comprising data points contained in the bounding region; and
apply plane and object detection to the second subset of depth data to identify the target object.

22. The non-transitory computer-readable medium of claim 15, wherein the instructions further configure the processor to: dimension the target object and output dimensions of the target object.

* * * * *